June 17, 1958     A. D. BOSWELL     2,839,435

METHOD OF REACTOR PRODUCT REMOVAL BY EXPLOSIVE MEANS

Filed April 5, 1955

INVENTOR
ARTHUR D. BOSWELL
BY
Jackson B. Browning
ATTORNEY

2,839,435

METHOD OF REACTOR PRODUCT REMOVAL BY EXPLOSIVE MEANS

Arthur D. Boswell, Niagara Falls, N. Y., assignor to Union Carbide Corporation, a corporation of New York Application April 5, 1955, Serial No. 499,339

5 Claims. (Cl. 134—17)

This invention relates to a method of removing an imbedded mass from a reactor chamber by explosive means.

In various metallurgical processes where halides of high-melting point, reactive metals, such as titanium, tantalum and zirconium, are reduced in a reactor chamber, the resulting solidified reactor product is in the form of an imbedded mass and consists of an intimate mixture of the reducing elements and the pure high-melting point, metal sponge. These reactant components may be in various proportions to each other depending upon which metals and reducing agents were reacted. But, invariably, the problem of removing this firmly imbedded mass from the reactor chamber is constant and ever-present.

Various conditions may exist in this intimate mixture such as the presence of small percentages of unreacted and partially reduced products, concentrations of the individual constituents, and unpredictable, geographical position of the different components.

Numerous methods have been proposed for the removal of this solidified mixture, some of which include drilling, chipping or turning out by some rotating mechanism. Such methods, however, have been found to be time consuming, exceedingly expensive, and, in many instances, ineffective, since the material may at times be inaccessable to such removing apparatus or resistant to such forms of removal. Furthermore, the expensive tools employed in such processes will rapidly wear out and necessitate costly replacement.

It is, therefore, the primary object of the present invention to provide a method for the removal of this imbedded mass quickly, safely, and inexpensively. A further object of the present invention is to remove the reactant mixture in such a manner, whereby it may be shattered to a size which allows ease of handling and subsequent size reduction in leaching operations.

In accordance with the method employed in the invention, the reactant mixture is removed from the reaction chamber by explosive means. In order to more fully describe the method of such removal, reference is made to the accompanying drawings which schematically show the details employed in the process of the invention.

Figure 1:
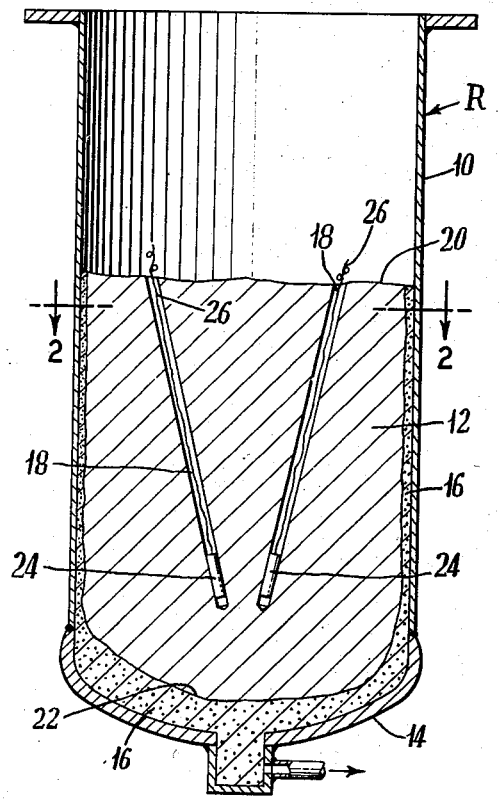
Fig. 1 is an elevated, sectional view of the reactor chamber and the solidified imbedded mixture.
Figure 2:
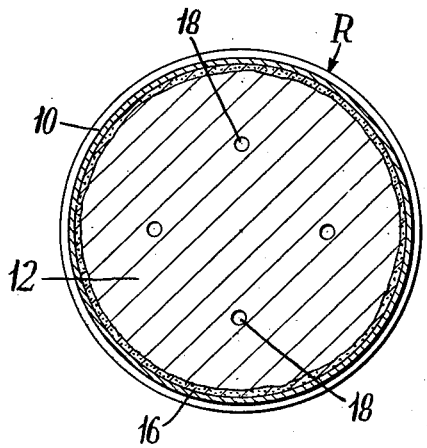
Fig. 2 is a section taken on the line 2—2 of Fig. 1.

Referring to Fig. 1 of the drawings, the reactant mixture is allowed to solidify in the reactor chamber R and, in addition to the natural hardness of the imbedded mass, adheres quite firmly to the reactor wall 10. A minor portion of the salt is generally fused within the mixture bed 12. The greater part of the salt, however, is at the bottom 14 of the reactor chamber R and along the reactor wall 10 forming a salt layer 16. The salt layer 16 generally forms a relatively thin layer along and adheres quite firmly to the reactor wall 10 in addition to a thick layer at the bottom 14 of the reactor chamber R which is relatively inaccessible.

Although various conditions govern the techniques employed, a plurality of holes 18 is drilled in a convergent manner through the mixture bed 12 to some intermediate point between the free and accessible surface 20 and the bottom 22 of the mixture bed 12. Explosion-producing charges 24 are inserted into the plurality of drilled holes 18 and their ignition wires 26 extend through the free surface 20 from a common detonating device located outside the reaction chamber R.

In order that the reactor wall 10 act as a backup and impelling force to concentrate the charge toward the center of the mixture bed 12, thus giving a lifting action to a major portion of the imbedded mass, the holes 18 to contain the explosion-producing charges 24 are drilled relatively near, and preferably 4 to 6 inches from, the reactor wall 10. It is important, however, that the holes are not drilled to the extreme bottom 14 of the reaction chamber R but to a point relatively close to the bottom 22 of the mixture bed 12 in order to utilize the salt layer 16 as a cushion. The focal point of the explosion should always be directed or located relatively close to the bottom 14 of the reactor chamber R so that the angle blow-out parts of the explosion-producing charges 24 can exert their upward thrust to the greater portion of the sponge.

In distributing the explosive force evenly throughout the imbedded mass, the symmetry of the drilled holes 18 is important. For example, where it has been determined that three cartridge-containing holes are to be drilled for the removal of the imbedded mass, they should be placed 120° apart along the periphery of the reactor chamber R and approximately four to six inches from the reactor wall 10. In a like manner, if four holes are to be drilled they should be located 90° apart; six holes, 60° apart, and so forth in that order. It is extremely important that the drill holes 18 be of minimum diameter to admit the explosion-producing charges 24 so that the force of the explosion will not be released through the holes 18. Whenever one of the holes 18 is drilled oversized, stemming with salt to retain the focal point of the explosion is necessary.

Another important feature which must be considered in removing the imbedded mass is the dimensions of the mixture bed 12. Generally, where the mixture bed 12 is of large diameter and small depth several shallow charges are sufficient to remove it from the reactor chamber R and split it to relatively small pieces. Where the diameter is smaller and the depth greater, a fewer number of charges, sunk to a greater depth, is sufficient.

The amount of explosion-producing charges 24 necessary to remove the imbedded mass generally depends upon the brittleness of the mixture which, in turn, is controlled by the salt-to-sponge ratio. The higher this ratio, the greater degree of brittleness that exists and the easier it is to remove the imbedded mass. As an example of the degree of force required to remove the reactants, it is twice as easy, and thus requires approximately ½ the charge, to remove a mixture where the salt-to-sponge ratio is 5 to 1 than where there is an equal quantity of salt and sponge. The amount of explosion-producing charge necessary to remove the imbedded mass depends upon which metals are being reacted and whether or not the salt is tapped out prior to the solidification of the reactants.

The explosion-producing charge 24 can be of several types but it is preferred to use a liquid gas which is gasified during the charge and thus expands considerably in volume to create the necessary pressure. A critical characteristic of the explosion-producing charge 24 is that the explosion be gradual as opposed to a violent burst, in order to remove the reactants in a slow-heave. Another important limitation is that the gas produced from the explosion should not be of a type which will contaminate the metal sponge.

Although the primary intent of the explosion is to remove the imbedded mass from the reactor chamber R it is further indicative that the imbedded mass be removed in relatively small particles to facilitate handling and to minimize subsequent reduction processes. In the leaching steps, a metal sponge mixture is generally reduced or crushed to pieces ranging in size to about ½ inch or less. Particle size in the subsequent leaching steps is important as it governs leaching time and separation of the mixture. In the method of reactor product removal of the imbedded salt-metal sponge combination, the explosive cartridges are detonated to cause a gas expansion which considerably cracks the metal sponge mixture to pieces in a size which to a greater part falls near or within the desired range. Knowledge of the reaction products and the degree to which the reaction proceeds control, to a great extent, the rate of explosion necessary to shatter the mixture bed 12 to the desired size for the secondary crushing and leaching steps.

The removal of an intimate mixture composed of a salt-metal sponge combination has been effected by the use of explosive producing cartridges according to the methods herein described. These cartridges consist of a tube generally composed of a chrome-molybdenum steel, capable of withstanding up to about 40,000 pounds per sq. in. pressure. Into one end of this tube is threaded a charging cap which houses a valve and two electric terminals for connecting the firing cable to the heater element. The heater element is ¼ inch in diameter and about 12 inches in length, consisting of about 13 grams of finely-powdered coal mixed with about 87 grams of potassium perchlorate ($KClO_4$). The explosive cartridge is ignited by allowing current to flow to the electric terminals causing the chemicals in the heater element to react and thereby to generate enough heat to gasify the liquid-sealed tube instantly, increasing the pressure in the tube. When this pressure reaches approximately 14,000 pounds per sq. in. a soft steel shearing disk in the discharge cap ruptures, allowing the liquified gas to expand rapidly to approximately 450 times its liquid volume, creating a powerful heaving action. These cartridges come in various strengths but operate on the same principle. Generally, the type of cartridge usually employed in the removal of the reactant products is the commercial 2–100 Cardox cartridge containing approximately 100 cubic inches (3 pounds) of liquid carbon dioxide and releasing 45,000 cubic inches of gas when detonated.

The method herein described for the removal of reactants from its reaction chamber, has been successfully employed in removing the products of a titanium tetrachloride-sodium reaction. In one experiment employing the method herein described, a solidified mass of titanium sponge and sodium chloride was produced from a titanium tetrachloride-sodium reaction and measured 58 inches in diameter and 5¼ feet deep. Four holes, the exact diameter of the charge, were drilled 4 inches from the side walls of the reactor into the mass within approximately 6 inches from the bottom. The holes were drilled 90 degrees apart and Cardox cartridges were inserted into the holes. These cartridges each contained 64 ounces of liquid carbon dioxide and 135 grams of heater element, of which 17.55 grams is finely-powdered coal and 117.45 grams of potassium perchlorate. A shearing disk gauge, set to blast at a pressure of 20,000 pounds per sq. in., is also contained within the cartridge. All four charges were detonated simultaneously, and a 100° removal of the imbedded mass was effected, even though a heavy crust had formed on top of the reactant mass which adhered tightly to the wall of the reactor. The sponge bed was considerably cracked and the particle size sufficient to render the material acceptable to subsequent leaching.

In a similar experiment, only three holes, 120 degrees apart, were drilled into the reactant bed. The lower charge was sufficient since no heavy crust had formed upon the reactant mass. Charges of similar individual strength as outlined above were detonated, and 98% of the mass was thus removed.

A parallel wiring of the charges was employed in the above and like experiments to effect the simultaneous firing of the cartridges and is preferred over series wiring. Although only the commercial Cardox cartridges were employed as the charge, other explosives which are characterized by a slow, "lifting" action and which do not generate contaminating gases can also be utilized with equal efficiency.

By co-ordinating the height and width of the reactant mass and its density, a proportionate degree of explosives thus serves to remove an otherwise difficultly extricable mass quite easily from the reactant chamber and in a manner whereby the products are shattered to a size which will facilitate handling and subsequent leaching operations.

What is claimed is:

1. A method of removing from a chamber an adhering solidified mass having a free and accessible surface exposed within said chamber and an inaccessible surface remote from said accessible surface comprising providing in said mass a plurality of cavities having extensions disposed to converge through said mass toward a common point adjacent said inaccessible surface, inserting within each of said cavities an explosion-producing charge and setting off said charge so as to exert a blow-out thrust on a major portion of said mass, whereby said mass is removed and cracked into relatively small particles.

2. A method of removing from a chamber an adhering solidified mass having a free and accessible surface exposed within said chamber and an inaccessable surface remote from said accessible surface comprising providing in said mass a plurality of symmetrically spaced cavities having extensions disposed to converge through said mass toward a common point adjacent said inaccessible surface, inserting within each of said cavities an explosion-producing charge and setting off said charge so as to exert a blow-out thrust on a major portion of said mass, whereby said mass is removed and cracked into relatively small particles.

3. A method of removing from a chamber an adhering solidified mass having a free and accessible surface exposed within said chamber and an inaccessible surface remote from said accessible surface comprising providing in said mass and relatively close to the adhering edge of said mass a plurality of symmetrically spaced cavities having extensions disposed to converge through said mass toward a common point adjacent said inaccessible surface, inserting within each of said cavities an explosion-producing charge of the gradual-expansion type and setting off said charge so as to exert a slow-heave blow-out thrust on a major portion of said mass, whereby said mass is removed and cracked into relatively small particles.

4. A method of removing from a chamber an adhering solidified mass having a free and accessible surface exposed within said chamber and an inaccessible surface remote from said accessible surface comprising providing in said mass and relatively close to the adhering edge of said mass a plurality of symmetrically spaced cavities having extensions disposed to converge through said mass toward a common point adjacent said inaccessible surface, inserting within each of said cavities an explosion-producing charge comprising of a non-contaminating liquified gas, and simultaneously setting off said charges by gasifying said liquified gas to produce a slow heave blow-out thrust on a major portion of said mass, whereby said mass is removed and cracked into relatively small particles.

5. A method of removing from a chamber an adhering solidified mass having an upper free and accessible surface exposed within said chamber and comprising a relatively hard core in an outer shell relatively softer than said core, which method comprises providing in said mass to a depth short of said outer softer shell at the lower portion of said mass and relatively close to the adhering edge of said mass a plurality of symmetrically spaced cavities having extensions disposed to converge through said mass toward a common point located in said mass relatively close to the bottom of said chamber, inserting within each of said cavities an explosion-producing charge comprised of a non-contaminating liquified gas, and simultaneously setting off said charges by gasifying said liquified gas to produce a slow-heave blow-out thrust on a major portion of said mass, whereby said mass is removed and cracked into relatively small particles.

References Cited in the file of this patent

UNITED STATES PATENTS

| | | |
|---|---|---|
| 770,459 | Frye | Sept. 20, 1904 |
| 2,429,967 | Sorensen | Oct. 28, 1947 |